United States Patent
Dewald, III

(10) Patent No.: US 12,146,707 B2
(45) Date of Patent: Nov. 19, 2024

(54) DEVICE AND METHODS FOR DETERMINING AND USING EVAPORATION PARAMETERS IN A DRYING SYSTEM

(71) Applicant: E3 TECHNOLOGIES LLC., Indianapolis, IN (US)

(72) Inventor: Charles Dewald, III, Talbott, TN (US)

(73) Assignee: E3 Technologies LLC., Indianapolis, IN (US)

( * ) Notice: Subject to any disclaimer, the term of this patent is extended or adjusted under 35 U.S.C. 154(b) by 695 days.

(21) Appl. No.: 17/316,892

(22) Filed: May 11, 2021

(65) Prior Publication Data
US 2021/0348846 A1    Nov. 11, 2021

Related U.S. Application Data

(60) Provisional application No. 63/022,824, filed on May 11, 2020.

(51) Int. Cl.
| | |
|---|---|
| F26B 21/08 | (2006.01) |
| F26B 21/10 | (2006.01) |
| F26B 21/12 | (2006.01) |
| G01N 25/62 | (2006.01) |

(52) U.S. Cl.
CPC ............ *F26B 21/086* (2013.01); *F26B 21/10* (2013.01); *F26B 21/12* (2013.01); *G01N 25/62* (2013.01)

(58) Field of Classification Search
CPC ....... G01N 25/62; F26B 21/086; F26B 21/10; F26B 21/12
See application file for complete search history.

(56) References Cited

U.S. PATENT DOCUMENTS

| | | | | |
|---|---|---|---|---|
| 4,672,560 A | * | 6/1987 | Katayama | G01W 1/17 702/30 |
| 4,672,561 A | | 6/1987 | Katayama et al. | |
| 6,530,160 B1 | * | 3/2003 | Gookins | F26B 3/286 34/418 |
| 2002/0113132 A1 | | 8/2002 | Shah | |
| 2004/0108388 A1 | | 6/2004 | Wacker | |
| 2004/0144106 A1 | * | 7/2004 | Douglas | F25B 49/02 62/186 |
| 2015/0331023 A1 | * | 11/2015 | Hwang | G06Q 50/06 702/60 |
| 2019/0235459 A1 | | 8/2019 | Holleran et al. | |

FOREIGN PATENT DOCUMENTS

KR        101927984 B1    2/2019

OTHER PUBLICATIONS

International Search Report PCT/US2021/031546 dated Sep. 1, 2021 (pp. 1-9).

* cited by examiner

*Primary Examiner* — Paul M. West
(74) *Attorney, Agent, or Firm* — Millen, White, Zelano & Branigan P.C.; William F. Nixon

(57) ABSTRACT

A process for determining the drying time for a structure or building uses energy values based on sensible and latent energy to determine the enthalpy evaporation evaluation value for a condition. The condition includes the ambient temperature, the dew point temperature, and the wet bulb temperature for the air. The condition also includes the ambient humidity ratio, the dew point humidity ratio, and the wet bulb humidity ratio. The process can be implemented in a device that uses these values to determine the enthalpy evaporation evaluation value, which is used to predict a drying time for the materials.

7 Claims, 8 Drawing Sheets

DEVICE AND METHODS FOR DETERMINING AND USING EVAPORATION PARAMETERS IN A DRYING SYSTEM

BACKGROUND OF THE INVENTION

Field of the Invention

The present invention relates to methods, device, and system to evaluate evaporation parameters of the air exposed to materials, such as building materials. The present invention also relates to using these parameters in drying remediation operations.

Discussion of the Related Art

The current drying industry for structures has debated for years about which types of equipment and equipment configurations, such as refrigerant dehumidifiers, desiccant dehumidifiers, heating units, and the like, work the best for a given drying scenario. Various equations and principles have been proposed to provide estimates for parameters such as drying times, energy needed for a job, and the like. Each one falls short of accurately estimating and evaluating what will be needed.

Because these processes cannot effectively evaluate the parameters for evaporation, no devices or systems exist that can do so.

SUMMARY OF THE INVENTION

A method is disclosed. The method includes determining an ambient sensible energy value based on an ambient temperature value and an ambient humidity ratio value for air in an environment. The method also includes determining a dew point sensible energy value based on a dew point temperature value and a dew point humidity ratio value for the air in the environment. The method also includes determining a wet bulb sensible energy value based on a wet bulb temperature value and a wet bulb humidity ratio value for the air in the environment. The method also includes determining an ambient latent energy value based on the ambient humidity ratio value for the air in the environment. The method also includes determining a dew point latent energy value based on the dew point humidity ratio value for the air in the environment. The method also includes determining a wet bulb latent energy value based on the wet bulb humidity ratio value for the air in the environment. The method also includes determining an enthalpy evaporation evaluation value for the environment based on the ambient sensible energy value, the dew point sensible energy value, the wet bulb sensible energy value, the ambient latent energy value, the dew point latent energy value, and the wet bulb latent energy value.

A device is disclosed. The device is configured to determine an ambient sensible energy value based on an ambient temperature value and an ambient humidity ratio value for air in an environment. The device also is configured to determine a dew point sensible energy value based on a dew point temperature value and a dew point humidity ratio value for the air in the environment. The device also is configured to determine a wet bulb sensible energy value based on a wet bulb temperature value and a wet bulb humidity ratio value for the air in the environment. The device also is configured to determine an ambient latent energy value based on the ambient humidity ratio value for the air in the environment. The device also is configured to determine a dew point latent energy value based on the dew point humidity ratio value for the air in the environment. The device also is configured to determine a wet bulb latent energy value based on the wet bulb humidity ratio value for the air in the environment. The device also is configured to determine an enthalpy evaporation evaluation value for the environment based on the ambient sensible energy value, the dew point sensible energy value, the wet bulb sensible energy value, the ambient latent energy value, the dew point latent energy value, and the wet bulb latent energy value.

A system also is disclosed. The system is configured to determine an ambient sensible energy value based on an ambient temperature value and an ambient humidity ratio value for air in an environment. The system also is configured to determine a dew point sensible energy value based on a dew point temperature value and a dew point humidity ratio value for the air in the environment. The system also is configured to determine a wet bulb sensible energy value based on a wet bulb temperature value and a wet bulb humidity ratio value for the air in the environment. The system also is configured to determine an ambient latent energy value based on the ambient humidity ratio value for the air in the environment. The system also is configured to determine a dew point latent energy value based on the dew point humidity ratio value for the air in the environment. The system also is configured to determine a wet bulb latent energy value based on the wet bulb humidity ratio value for the air in the environment. The system also is configured to determine an enthalpy evaporation evaluation value for the environment based on the ambient sensible energy value, the dew point sensible energy value, the wet bulb sensible energy value, the ambient latent energy value, the dew point latent energy value, and the wet bulb latent energy value.

A computer program stored on a computer readable medium is disclosed. The computer program includes instructions that, when read by a processor, cause the processor to determine an ambient sensible energy value based on an ambient temperature value and an ambient humidity ratio value for air in an environment. The instructions also cause the processor to determine a dew point sensible energy value based on a dew point temperature value and a dew point humidity ratio value for the air in the environment. The instructions also cause the processor to determine a wet bulb sensible energy value based on a wet bulb temperature value and a wet bulb humidity ratio value for the air in the environment. The instruction also cause the processor to determine an ambient latent energy value based on the ambient humidity ratio value for the air in the environment. The instructions also cause the processor to determine a dew point latent energy value based on the dew point humidity ratio value for the air in the environment. The instructions also cause the processor to determine a wet bulb latent energy value based on the wet bulb humidity ratio value for the air in the environment. The instructions also cause the processor to determine an enthalpy evaporation evaluation value for the environment based on the ambient sensible energy value, the dew point sensible energy value, the wet bulb sensible energy value, the ambient latent energy value, the dew point latent energy value, and the wet bulb latent energy value.

BRIEF DESCRIPTION OF THE DRAWINGS

The accompanying drawings are included to provide further understanding of the invention and constitute a part of the specification. The drawings listed below illustrate embodiments of the invention and, together with the description, serve to explain the principles of the invention, as disclosed by the claims and their equivalents.

DETAILED DESCRIPTION OF THE PREFERRED EMBODIMENTS

Figure 1:
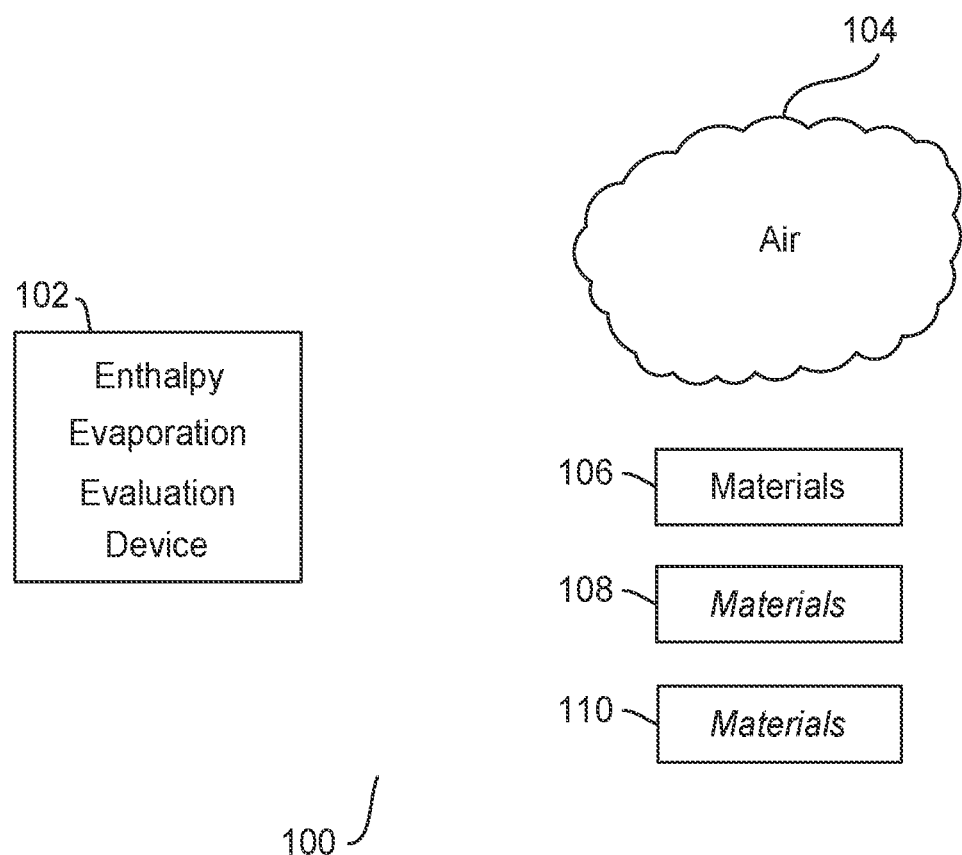
FIG. 1 illustrates a drying chamber environment using an enthalpy evaporation evaluation device according to the disclosed embodiments.

Aspects of the invention are disclosed in the accompanying description. Alternate embodiments of the present invention and their equivalents are devised without parting from the spirit or scope of the present invention. It should be noted that like elements disclosed below are indicated by like reference numbers in the drawings.

Evaporation of water, especially in a structure, is an energy transfer process. Energy is required to increase the kinetic energy or movement of the water molecules. Energy also may be required to break the bonds between a hydrogen (H) and oxygen (O) atom between neighboring water molecules. As energy is added to an environment like a water damaged building, the energy is used to either increase the temperature of the air (0.24 btu/lb-° F.), increase the temperature of water vapor in air and materials (0.45 btu/lb-° F.), increase the temperature of the liquid water in materials (1 btu/lb-° F.), increase the temperature of the building materials (0.34 btu/lb-° F.), change liquid water into vapor, or evaporation (1,061 btu/lb-° F.), or given up or transferred to the outside environment (based on $\Delta$btu/lb$_{IN\text{-}OUT}$). This information may be used to determine how much energy is required to raise any structure to any desired temperature and how much energy it would take to evaporate all the water in the materials to acceptable moisture content levels.

In some embodiments, the latent heat of vaporization is a parameter to consider. This parameter corresponds to how much energy is required to break enough hydrogen polar bonds to evaporate 1 lb of water and it averages about 1,061 btu/lb. The average amount of energy required for evaporation changes with temperature and ambient vapor pressure. As the temperature increases, the energy required for evaporation goes down. As the vapor pressure decreases, the energy required for evaporation goes down. Thus, if the average amount of energy required for evaporation goes down, then this means for the same energy added to a building, one would evaporate more water at higher temperatures and lower vapor pressures.

Prior to a water-related structural emergency, a structure, such as a building, may be in a fairly equalized state between the air and the materials resulting in similar energy values between the two. The air and materials may be in a state of equilibrium in terms of its energy content. The building may include two main systems for evaluation. One is the air in the building which includes its own energy values. Another is the materials in the building, which also includes its own energy values. These two systems have their own individual energy values and try to reach a state of equilibrium with each other. The larger the disequilibrium between the two systems, the more energy is transferred between the two systems.

In some embodiments, two major energy components may exist for the two systems of the air in the building and the materials in the building. For the air in the building, sensible energy and latent energy (in btu/lb) make up the total enthalpy of the air. For the materials in the building, sensible energy and latent energy can apply an enthalpy value to the material in btu/lb. In some instances, the air and materials within a building are constantly in reach of equilibrium with each other in terms of each one's total energy value, or enthalpy, but the energy components of the sensible and latent energy values drive the energy transfer between the two systems. Prior to water damage, the sensible and latent energy value for the air and the sensible and latent energy values for the materials are approximately in equilibrium with each other.

Energy moves from a higher concentration to a lower concentration. Thus, higher sensible energy values will move to lower sensible energy values. Likewise, higher latent energy values will move to lower latent energy values.

When water damage takes place, the two systems are thrown from a state of equilibrium to a very unequal state. The water that comes from the water damage moves quickly into the materials which means that the materials gained a large amount of latent energy. The materials system, as disclosed above, now has a much higher concentration of latent energy than the air system. The water that comes into the structure also usually is cooler in temperature than the inside, or ambient, air. The materials will now be cooler than the air. Further, a sensible energy gradient exists between the materials and the air.

In some embodiments, the air quickly starts to give up or transfer sensible energy to the cooler materials. This transfer of sensible energy is used for warming the materials or water, but mostly used to evaporate water, which is the transfer of latent energy from the materials to the air. In the disclosed embodiments, the larger the gradient between the sensible energies of the air and materials as well as the latent energy of the air and materials then the greater the energy transfer between the two system.

Thus, the disclosed embodiments seek to measure and estimate the transfer energy. For a water loss event, the disclosed embodiments seek to provide an environment that creates the largest gradients between both the sensible and latent energies of the air and materials throughout the water loss. In the disclosed embodiments, the sub-gradients of the sensible and latent energy values may be the driving force for evaporation as opposed to total enthalpy values for the air and the materials.

Various parameters may be used to determine the drying conditions that will evaporate water from building materials in an expedient manner. One issue is whether any metric, or parameter, can predict evaporation rates on its own without being affected by any other parameter. Parameters or metrics include relative humidity, temperature, dew point temperature, vapor pressure, wet bulb temperature, absolute humidity, enthalpy, latent energy, sensible energy, and specific humidity. None of these parameters by themselves can predict drying or evaporation rates.

For example, a 90° F. ambient temperature will not always dry better or faster than a 75° F. ambient temperature. 45 gpp will not always dry better or faster than 70 gpp. A 30% relative humidity will not always dry better or faster than a 45% relative humidity. A 0.34 inHG vapor pressure will not always dry better or faster than a 0.58 inHG vapor pressure. A 3.4 grains/ft$^3$ will not always dry better or faster than 4.2 grains/ft$^3$. A 47° F. dew point temperature will not always dry better or faster than a 60° F. dew point temperature. A 52° F. wet bulb temperature will not always dry better or faster than a 64° F. wet bulb temperature. A 38 btu/lb enthalpy will not always dry better or faster than a 27 btu/lb enthalpy. A 21 btu/lb sensible energy will not always dry better or faster than 16 btu/lb sensible energy. A 6.5 btu/lb latent energy will not always dry better or faster than a 12 btu/lb latent energy. Sometimes, each of these examples will dry better or faster and sometimes the examples will not. They are each controlled or impacted by others that are always changing.

The evaporation rates are controlled by the combination of the parameters or terms disclosed above. Further, the evaporation rates are controlled by the terms that display energy values because evaporation is an energy transfer process. If none of the parameters or terms listed above can independently provide information about evaporation rates within a building, then why should time be taken to record these measurements. Further, what should a device or system to predict evaporation rates consider in estimating these rates.

The disclosed parameters may include specific humidity, vapor pressure, absolute humidity, dew point temperature, and latent energy. These values provide an idea of how much water is in the air. These values also accomplish this regardless of what the ambient temperature is. The higher the value for each one of these, the more water vapor is in the air. Thus, these parameters or terms may not be solely responsible for predicting evaporation rates.

The disclosed parameters may include specific humidity and absolute humidity. These parameters provide the exact information of the density of water vapor in the air or the ratio of water vapor to dry air. These values can be used to effectively evaluate the performance of dehumidifiers. The other values may not give the exact density or ratios but may possess a direct relationship with the amount of water vapor in the air.

The disclosed parameters may include relative humidity. This parameter may not provide information on how much physical water is in the air. In other words, relative humidity is not directly related to the amount of water vapor in the air. It also has no energy value so it may not help in determining the evaporation process. Relative humidity does have a relationship to the equilibrium moisture content value of building materials but, again, it is not directly related to the rate at which these equilibrium values are achieved. One can have the same EMC % value but the condition may have taken 2 to 3 times as long to get to this equilibrium value.

The parameters also may include ambient temperature and sensible energy. These values provide how much kinetic energy is possessed by the air. One, however, cannot rely solely on the temperature of the air or material to indicate what is needed for the energy transfer process or evaporation rates.

The parameters also include enthalpy which gives the measurement of how much total energy that the air possesses. It also may be used to assign an enthalpy value to wet materials. One, however, may not shoot for the highest enthalpy values in trying to achieve the best evaporation rates. The metric does not work that way. It may have two components, sensible and latent energy. It is the combination and ratio of these two components that impact evaporation as opposed to the total enthalpy value.

The disclosed embodiments seek to use these principles to develop a process and associated devices to define, measure, and record evaporation rates. The disclosed device may receive information and data regarding the above parameters at any condition and then generates a value that is used to provide hard, viable, and repeatable results to the energy transfer process of evaporation in a wet building. The disclosed embodiments provide a value and determination that can be used to know what the evaporation rate is at any given time or condition. The disclosed embodiments also compare this rate on a linear scale to any other condition. For example, a rate of 100 would evaporate and dry a building twice as fast as a condition with a rate of 50. The disclosed embodiments also provide a set of tools for calculating the rate of evaporation if changes are made within the drying chamber or environment that are the most impactful. For example, the disclosed device can determine the change in evaporation rate if the temperature is raised in the chamber by 10-15° F. but the grains/lb also increase as well. The disclosed embodiments also provide the ability to set daily targets in terms of the evaporation rate of the drying chamber for all types of equipment and all outside conditions.

FIG. 1 depicts a drying chamber environment 100 using an enthalpy evaporation evaluation device 102 according to the disclosed embodiments. Drying chamber environment 100 may be a building or other structure that recently suffered water damage and needs remediation in order to be returned to normal. As disclosed above, air 104 and materials 106, 108, and 110 may impact the time needed to remediate the structure.

Air 104 may include values for various conditions of the air. In some embodiments, these values may be related to parameters to measure the evaporation ability for environment 100. The parameters include ambient temperature, dew point temperature, wet bulb temperature, ambient humidity ratio, dew point humidity ration, and wet bulb humidity ratio. These parameters may be measured or determined by enthalpy evaporation evaluation device 102 and used to determine an energy evaluation of air 104.

Materials 106, 108, and 110 may relate to items in the structure of environment 100. Materials 106-110 may differ in what they actually are. Materials 106 may relate to the walls and ceilings in environment while materials 108 may relate to the floors or ground. Materials 110 may be removable items in environment 100, such as furniture or fixtures. The materials also may have various values for the parameters disclosed herein.

Figure 2:
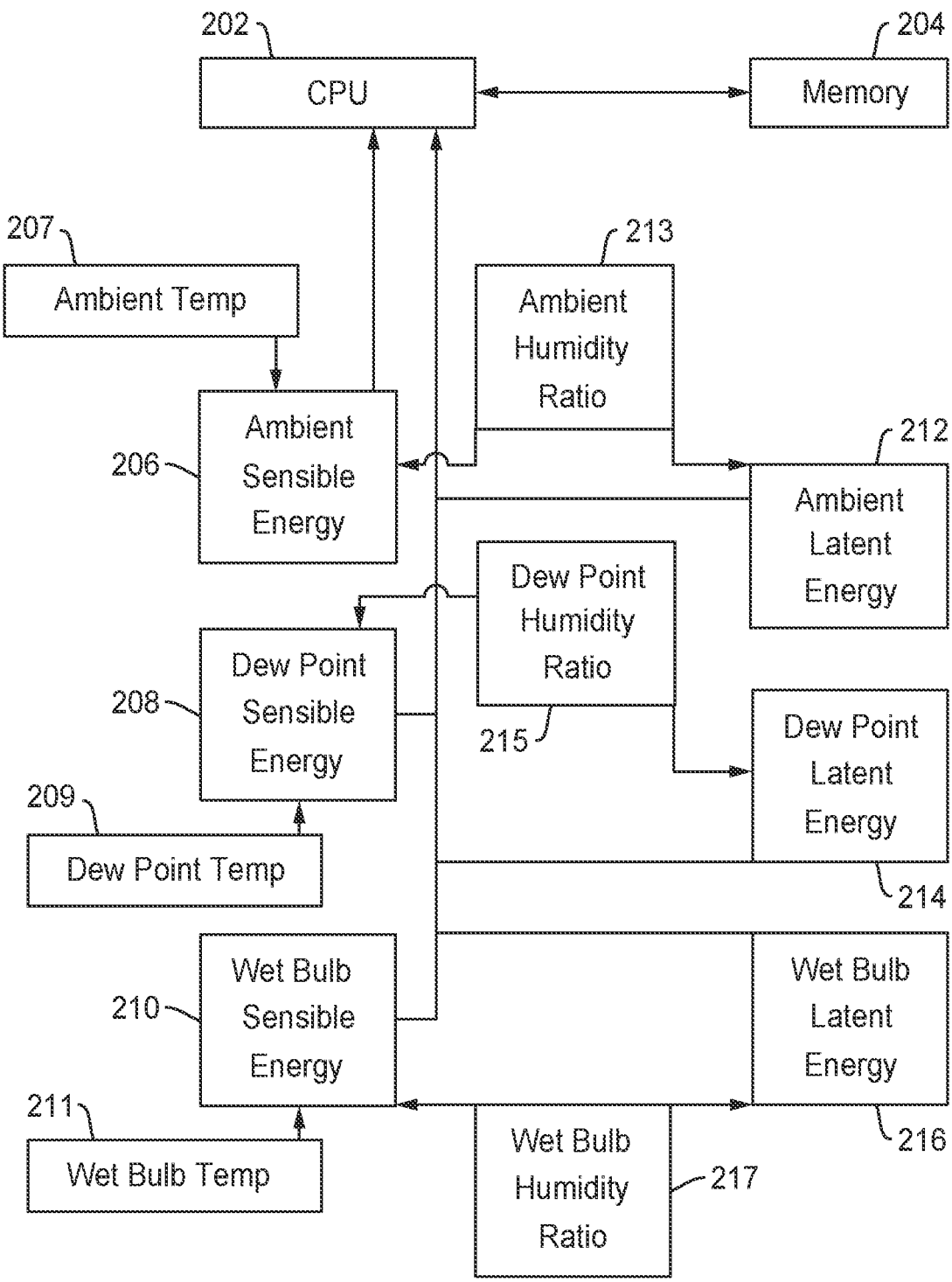
FIG. 2 illustrates a block diagram for an enthalpy evaporation evaluation device according to the disclosed embodiments.

FIG. 2 illustrates a block diagram for enthalpy evaporation evaluation device 102 according to the disclosed embodiments. FIG. 2 may show components within device 102 or functional modules that execute on device 102 to enable the functionality of the components. Enthalpy evaporation evaluation device 102 applies the principles and relationships disclosed herein to measure and determine evaporation rates for a structure or environment. Device 102 also may be used to determine the best evaporation rate using these principles and relationships based on inputted parameters.

Enthalpy evaporation evaluation device 102 includes a computing processing unit (CPU) 102 that processes data and executes instructions stored in memory 104 to configure the device to measure and determine evaporation rates as well as optimal parameters for remediating an environment having water damage. Device 102 may be a device having sensors or input that is taken to the environment to obtain the data needed to provide the evaporation rates. Device 102 also may be a computing device that is provided the data in order to perform the functions disclosed herein. Device 102 also may be split between two or more actual devices. For example, measurements and data may be obtained by components disclosed for device 102 and sent to other components for processing. Alternatively, device 102 may be incorporated into another device being used to mitigate water damage in a structure or used at a site having mitigation done.

The disclosed embodiments utilize the relationships between various parameters of evaporation to collect and process data to predict the evaporation rate or time to remediate a structure. This relationship may shown by the following equation:

$$[B(w)+F(w)] \times 100 = E3, \qquad \text{Equation 1:}$$

wherein E3 means enthalpy evaporation evaluation or the energy evaluation of ambient air. Equation 1 may be further broken down into the following equations:

$$[(A(s) \div A(l))/(Dp(s) \div Dp(l))] \times [(A(s) - Dp(s))/Dp(s)] \times 0.5 = B(w) \qquad \text{Equation 2:}$$

and $$[(A(s) \div A(l))/(Wb(s) \div Wb(l))] \times [[(A(s) \div A(l))/(Wb(s) \div Wb(l))] \times [(A(s) - Wb(s))/Wb(s)) + (Wb(l) - A(l))/Wb(l))]] \times 0.5 = F(w). \qquad \text{Equation 3:}$$

The parameter A(s) may refer to the ambient sensible energy and may be determined according to $$(0.24 \text{ btu/lb-}^\circ\text{F.})(Ta^\circ \text{ F.}) + Wa[(0.45 \text{ btu/lb-}^\circ\text{F.})(Ta^\circ \text{F.})] = A(s). \qquad \text{Equation 4:}$$

The parameter Dp(s) may refer to the dew point sensible energy and may be determined according to $$(0.24 \text{ btu/lb-}^\circ\text{F.})(Tdp^\circ \text{ F.}) + Wdp[(0.45 \text{ btu/lb-}^\circ\text{F.})(Tdp^\circ \text{ F.})] = Dp(s). \qquad \text{Equation 5:}$$

The parameter Wb(s) may refer to the wet bulb sensible energy and may be determined according to $$(0.24 \text{ btu/lb-}^\circ\text{F.})(Twb^\circ \text{ F.}) + Wwb[(0.45 \text{ btu/lb-}^\circ\text{F.})(Twb^\circ \text{ F.})] = Wb(s). \qquad \text{Equation 6:}$$

The parameter A(l) may refer to ambient latent energy and may be determined according to $$Wa(1061 \text{ btu/lb}). \qquad \text{Equation 7:}$$

The parameter Dp(l) may refer to dew point latent energy and may be determined according to $$Wdp(1061 \text{ btu/lb}). \qquad \text{Equation 8:}$$

The parameter Wb(l) may refer to wet bulb latent energy and may be determined according to $$Wwb(1061 \text{ btu/lb}). \qquad \text{Equation 9:}$$

In equations 4-9, the following terms may refer to the following measurable parameters. Ta may refer to ambient temperature. Tdp may refer dew point temperature. Twb may refer to wet bulb temperature. Wa may refer to the ambient humidity ratio, with ambient being gpp/7000 gpp=lb/lb. Wdp may refer to the dew point humidity ration, with dew point being gpp/7000 gpp=lb/lb. Wwb may refer to the wet bulb humidity ratio.

These parameters may be measured or determined by device 102. CPU 202 may calculate the values for the parameters and store these in memory 104. Device 102 also may receive inputs for these values in order to estimate drying times or an evaporation evaluation of a system of devices being used to mitigate a wet structure having air 104 and materials 106-110.

Device 102 also may include an ambient sensible energy module 206 that receives data from ambient temperature sensor 207 and ambient humidity ratio sensor 213. Ambient temperature sensor 207 may measure the ambient temperature of air 104. In some embodiments, this value may be input into ambient sensible energy module 206. Ambient humidity ratio sensor 213 also provides data to ambient sensible energy module 206 of the ambient humidity ratio of air 104. Ambient sensible energy module 206 may implement equation 4 above to determine the ambient sensible energy, or A(s), using the provided values for the ambient temperature, or Ta, and the ambient humidity ratio, or Wa.

Device 102 also may include a dew point sensible energy module 208 that receives data from dew point temperature sensor 209 and dew point humidity ratio sensor 215. Dew point temperature sensor 209 may measure the dew point temperature of air 104. In some embodiments, this value may be input into dew point sensible energy module 208. Dew point humidity ratio sensor 215 also provides data to dew point sensible energy module 208 of the dew point humidity ratio of air 104. Dew point sensible energy module 208 may implement equation 5 above to determine the dew point sensible energy, or Dp(s), using the provided values for the dew point temperature, or Tdp, and the dew point humidity ratio, or Wdp.

Device 102 also may include a wet bulb sensible energy module 210 that receives data from wet bulb temperature sensor 211 and wet bulb humidity ratio sensor 217. Wet bulb temperature sensor 211 may measure the wet bulb temperature of air 104. In some embodiments, this value may be input into wet bulb sensible energy module 211. Wet bulb humidity ratio sensor 217 also provides data to wet bulb sensible energy module 210 of the wet bulb humidity ratio of air 104. Wet bulb sensible energy module 210 may implement equation 6 above to determine the wet bulb sensible energy, or Wb(s), using the provided values for the wet bulb temperature, or Twb, and the wet bulb humidity ratio, or Wwb.

Device 102 also may include ambient latent energy module 212 that receives data from ambient humidity ratio sensor 213. Ambient latent energy module 212 may implement equation 7 disclosed above to determine the ambient latent energy, or A(l), of air 104. Ambient humidity ratio sensor 213 provides the value for the ambient humidity ratio, or Wa. It should be noted that this value also may be input to ambient latent energy module 212.

Device 102 also may include dew point latent energy module 214 that receives data from dew point humidity ratio sensor 215. Dew point latent energy module 214 may implement equation 8 disclosed above to determine the dew point latent energy, or Dp(l), of air 104. Dew point humidity ratio sensor 215 provides the value for the dew point humidity ratio, or Wdp. It should be noted that this value also may be input to dew point latent energy module 214.

Device 102 also may include wet bulb latent energy module 216 that receives data from wet bulb humidity ratio sensor 217. Wet bulb latent energy module 216 may implement equation 9 disclosed above to determine the wet bulb latent energy, or Wb(l), of air 104. Wet bulb humidity ratio sensor 217 provides the value for the wet bulb humidity ratio, or Wwb. It should be noted that this value also may be input to wet bulb latent energy module 216.

The values for these parameters may be provided to CPU, which implements equation 1 using equations 2 and 3 to determine an enthalpy evaporation evaluation value. This value may be used to determine evaporation rates and other information that may be used in determining the optimal way to mitigate environment 100 after water damage. This value, or the E3 value, provides a metric that measures and predict the drying rate with accuracy, which improves the determination of the best way to mitigate water damage in a structure.

The disclosed embodiments provide an E3 value for an energy evaluation of the ambient air. The E3 value is not one of the ambient temperature, the grains/lb, the relative humidity, the vapor pressure, or even the total enthalpy. Instead, the E3 value reflects the relationship between the air's sensible and latent energy values. Device 102 may implement the disclosed relationship to determine a singular value that takes all the energy values and components to determine metric that indicates how good or bad a set of conditions is for drying. Further, the E3 value is linear in its relationship, which means that if a condition having a combination of temperature and humidity, has an E3 value of 100 compared to another condition with an E3 value of 50, then the condition with the value of 100 will dry twice as fast as the condition with the value of 50. Thus, the disclosed embodiments provide clear direction for what needs to be done on any job with different types of drying equipment.

The disclosed embodiments allow any condition to be plugged into device 102 to see how the condition will evaporate water from a wet building. One may come into any job or environment and conduct analysis if the temperature of air 104 is changed from its existing value to a new one or the humidity changes to this new value, what will this new condition provide in terms of improving or reducing the drying ability. The disclosed embodiments utilize knowing what ambient conditions are possible to achieve with all the different types of drying equipment, such as conventional DHs, LGR DHs, desiccant DHs on all pressurizations, and heaters, and the like. These conditions may be measured or entered into device 102 and its modules to determine which drying equipment or technology will work the best.

For example, the E3 values may be determined and compared for three conditions. Condition 1 may include an ambient temperature of 70 degrees F., a relative humidity of 35%, and 38 grains per pound (gpp). The E3 value for condition 1 may be 131 with a drying time prediction of 3.9 days. Condition 2 may include an ambient temperature of 90 degrees F., a relative humidity of 25%, and 52 gpp. The E3 value for condition 2 may be 171 with a drying time prediction of 3.0 days. Condition 3 may include an ambient temperature of 115 degrees F., a relative humidity of 17.5%, and 77 gpp. The E3 value for condition 3 may be 210 with a drying time prediction of 2.4 days.

Figure 3:
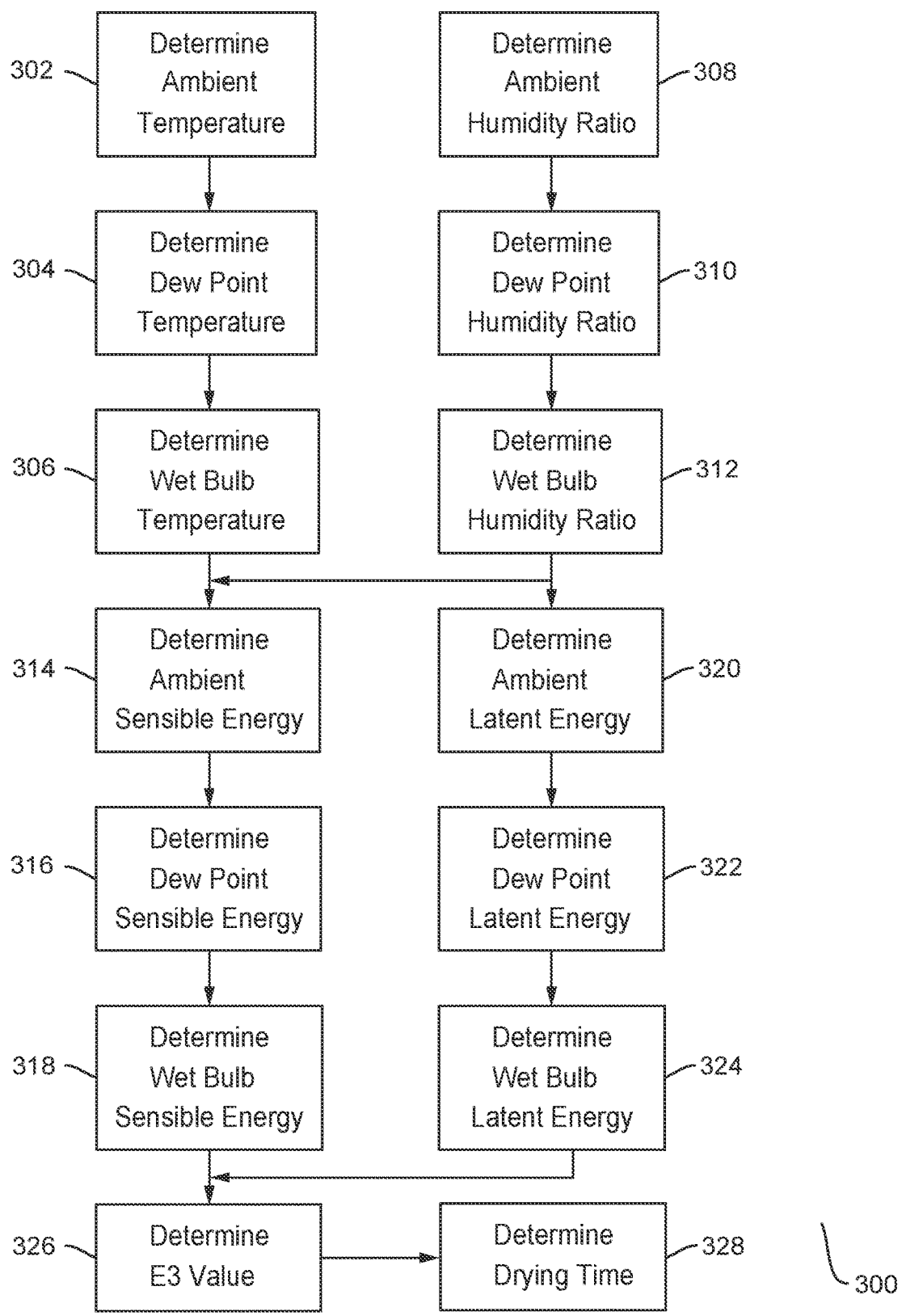
FIG. 3 illustrates a flowchart for performing an enthalpy evaporation evaluation using device according to the disclosed embodiments.

FIG. 3 depicts a flowchart 300 for performing an enthalpy evaporation evaluation using device 102 according to the disclosed embodiments. Flowchart 300 may refer back to FIGS. 1 and 2 for illustrative purposes. Flowchart 300, however, is not limited to the embodiments disclosed by FIGS. 1 and 2.

Step 302 executes by determining the ambient temperature, or Ta, for the air in the drying chamber of environment. Referring back to FIG. 2, ambient temperature Ta may be measured by ambient temperature sensor 207. In some embodiments, the ambient temperature may be input into device 102 and stored in memory 204.

Step 304 executes by determining the dew point temperature, or Tdp, for the air in the drying chamber or the environment. Dew point temperature Tdp may be measured by dew point temperature sensor 209. In some embodiments, the dew point temperature may be input into device 102 and stored in memory 204.

Step 306 executes by determining the wet bulb temperature, or Twb, for the air in the drying chamber or the environment. Wet bulb temperature Twb may be measured by wet bulb temperature sensor 211. In some embodiments, the wet bulb temperature may be input to device 102 and stored in memory 204.

Step 308 executes by determining the ambient humidity ratio, or Wa, for the air in the drying chamber or environment. Ambient humidity ratio sensor 213 may measure the value for Wa. Alternatively, the ambient humidity ratio may be input to device 102 and stored in memory 204.

Step 310 executes by determining the dew point humidity ratio, or Wdp, for the air in the drying chamber or the environment. Dew point humidity ratio sensor 215 may measure the value for Wdp. Alternatively, the dew point humidity ratio may be input to device 102 and stored in memory 204.

Step 312 executes by determining the wet bulb humidity ratio, or Wwb, for the air in the drying chamber or the environment. Wet bulb humidity ratio sensor 217 may measure the value for Wwb. Alternatively, the wet bulb humidity ratio may be input to device 102 and stored in memory 204.

Flowchart 300 may use the values determined or input by steps 302-312 to determine the values for the sensible and latent energy within the air. Thus, step 314 executes by determining the ambient sensible energy using ambient sensible energy module 206. Module 206 uses the values for ambient temperature Ta and ambient humidity ratio Wa to determine ambient sensible energy A(s). Preferably, equation 4 disclosed above is used to determine this parameter.

Step 316 executes by determining the dew point sensible energy using dew point sensible energy module 208. Module 208 uses the values for dew point temperature Tdp and dew point humidity ratio Wdp to determine dew point sensible energy Dp(s). Preferably, equation 5 disclosed above is used to determine this parameter.

Step 318 executes by determining the wet bulb sensible energy using wet bulb sensible energy module 210. Module 210 uses the values for wet bulb temperature Twb and wet bulb humidity ratio Wwb to determine the wet bulb sensible energy Wb(s). Preferably, equation 6 disclosed above is used to determine this parameter.

Step 320 executes by determining the ambient latent energy using ambient latent energy module 212. Module 212 uses the value for ambient humidity ratio Wa to determine the ambient latent energy A(l). Preferably, equation 7 disclosed above is used to determine this parameter.

Step 322 executes by determining the dew point latent energy using dew point latent energy module 214. Module 214 uses the value for dew point humidity ratio Wdp to determine the dew point latent energy Dp(l). Preferably, equation 8 disclosed above is used to determine this parameter.

Step 324 executes by determining the wet bulb latent energy using wet bulb latent energy module 216. Module 216 uses the value for wet bulb humidity ratio Wwb to determine the wet bulb latent energy Wb(l). Preferably, equation 9 disclosed above is used to determine this parameter.

Step 326 executes by using equations 1-3 to determine the E3 value for the condition having the values determined in steps 314-324. This relationship is disclosed in greater detail below. Step 328 executes by determining the drying time for the condition having the values disclosed above based on the E3 value.

The process disclosed by flowchart 300 starts with the energy values for air 104. This feature reflects the energy transfer process in that it is governed by a certain relationship or combination of energy values. These values are the sensible and latent energy components of air 104. Multiple components of air 104 may be assigned a sensible or latent energy value.

For example, the wet bulb component of air 104 may provide insight into the evaporation of free, or unbound, water. This water may be sitting inside the hollow spaces of materials and not chemically bound to the cell walls of the materials. The wet bulb component predicts the temperature difference from ambient to an equalized lower temperature that is directly impacted and related to the cooling of the material as a result of evaporation from the surface. As water is evaporated from the material, it takes the energy to evaporate with it, which lowers the temperature of the material. This drop in temperature or reduction in sensible energy is directly related to the gain of grains/lb or latent energy to the air stream from evaporation. In other words, there may be no change in the total enthalpy of the air stream, just equal changes in the latent and sensible energy values.

If the sensible energy value drops by 5 btus/lb, then the latent energy gets raised by 5 btus/lb. The greater the difference in latent and sensible energy values, the better the condition is for evaporating free water from a material. Because of this relationship, the disclosed embodiments start with the relationships of the wet bulb sensible and latent energy values for defining the evaporating of free water. When dealing with free water, in general, the temperature of the air or sensible energy may have a considerably greater impact on evaporation than the humidity or latent energy.

The disclosed embodiments also consider bound water. Bound water is within the materials and must be evaporated. Because bound water is chemically bound to the walls of the materials, it creates a stronger bond that must be overcome. It also creates the need for different factors causing evaporation. For bound water, the role of specific humidity or really latent energy may be more important than in free water.

Thus, the disclosed embodiments address the evaporation of bound water using the concept of the dew point temperature. The dew point principle is governed by the amount of sensible energy that must be removed from the air to cause such level of condensation to take place that liquid water eventually starts to pool up on the surface of the material. This may be nature's way of creating an efficient means of energy transfer between the material and the air, or materials 106-110 and air 104 in FIG. 1.

The condensed water droplets increases the surface area of the material thereby creating a greater means for energy transfer as nature is always trying to achieve equilibrium as quickly and effectively as possible. The amount of sensible energy that must be removed from the air to reach a point of visible and intense condensation is related to the composition of the air's sensible and latent energy values. Thus, condensation is tied to evaporation as well. The relationship of ambient sensible and latent energy values in relation with the dew point sensible and latent values may be used to control or explain the evaporation process as well as the condensation process. Thus, the disclosed embodiments utilize the relationships and ratios of all the sensible and latent energy components to more accurately determine drying time as well as optimize drying conditions.

Referring back to equation 1, both sides of the formula show the ratio of the ambient sensible energy value the ambient latent energy value. The disclosed embodiments seek to pair the greatest potential sensible energy value with the lowest potential latent energy value. This feature creates a larger differential between the sensible and latent energy values of the air and the material. The disclosed embodiments also use the ratios of the wet bulb and dew point in terms of their sensible and latent energy value. Both ratios define a part of the evaporation and condensation process. The disclosed embodiments also compare the difference in sensible energy values between the ambient and the dew point and then the difference in both sensible and latent energy values between ambient and the wet bulb.

Figure 4:
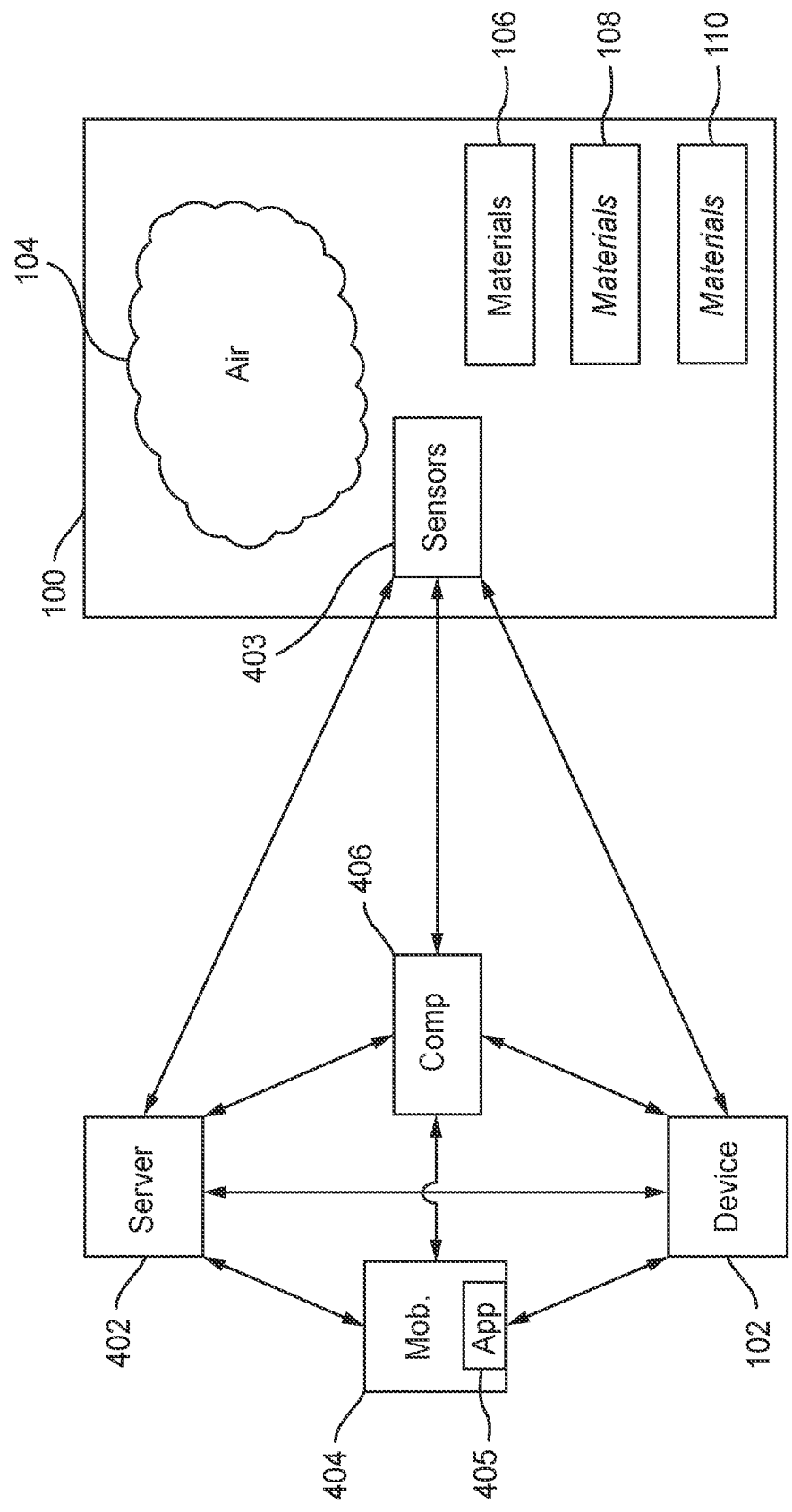
FIG. 4 illustrates a system for using the enthalpy evaporation evaluation device according to the disclosed embodiments.

FIG. 4 illustrates a system 400 for using enthalpy evaporation evaluation device 102 according to the disclosed embodiments. System 400 shows various components that may be used to implement the enthalpy evaporation evaluation processes disclosed above. It includes drying chamber environment 100, which may be a structure or building, having air 104 and materials 106, 108, and 110. Environment 100 may suffer from water damage in that air 104 and materials 106-110 are saturated with water above normal levels. As disclosed above, an imbalance between water levels in the air and materials may be occurring.

Device 102 performs the enthalpy evaporation evaluation processes disclosed above by obtaining data using sensors 403. Sensors 403 may collect information and data regarding environment 100. Preferably, sensors 403 collect information and data regarding air 104 in environment 100, even though data for materials 106-110 also may be collected. Sensors 403 include ambient temperature sensor 207, dew point temperature sensor 209, wet bulb temperature sensor 211, ambient humidity ratio sensor 213, dew point humidity ration sensor 215, and wet bulb humidity ratio sensor 217. These sensors may be placed in environment 100 and communicate wirelessly to device 102. In other words, the collected data may be captured in the structure but processed remotely by device 102.

In other embodiments, sensors 403 may be connected to device 102 using direct connections. Alternatively, sensors 403 may be connected, directly or wirelessly, with other components that then relay the data and information to device 102. System 100 also includes server 402, mobile device 404 with mobile application 405, and computer/laptop 406. These components may work with device 102 to collect, process, and store data for determining E3 values including daily target values. In some embodiments, these components also may include "device 102" in that the processing and evaluating of the collected data is done on the respective component. For example, computer 406 may act as device 102 in collecting data from sensors 403 and then determining the E3 values and other information to help with the drying process.

Server 402 may receive data collected by device 102 and processes it to determine an E3 value that may be used in drying operations. Further, server 402 also may store determined values as well as historical data. Alternatively, server 402 may be connected directly to sensors 403 and executes the processes disclosed above. Server 402 may be a cloud-based server connected to device 102 or sensors 403 through a network. Server 402 may have an IP address that serves as a destination for data being sent in system 100.

Mobile device 404 may enable several functions within system 100. Mobile application 405 may execute thereon to present data to a user and allow the user to control other components, such as device 102 or sensors 403. Mobile application 405 configures mobile device 404 into a special purpose device that determines E3 values as well as plan and manage drying operations for environment 100. Mobile application 405 may display the determined E3 value. It also may provide target values, estimated drying times, and the like. Mobile device 404 also may operate as device 102 in receiving data and performing analysis.

Computer 406 also may perform the functions of device 102, much like mobile device 404 or server 402. Computer 406 also may be part of a network of computers within system 400 that receive data from sensors 403 and feed the data to device 102. For example, each site of an environment 100 may include sensors 403 connected to a computer 406. The computers collect the data and maybe provide some initial processing before forwarding the detected data to device 102 for determining the E3 values. This way, device 102 may service any number of sites at a central location. Further, a device 102 may not need to be present at each job site, thereby reducing costs without sacrificing effectiveness.

System 400 may be implemented on a network, such as a local area network, at a job site. Alternatively, system 400 may be implemented online, or using a cellular network. Each component within system 400 may have its own IP address such that it may receive and send packets of information to other components.

Figure 5:
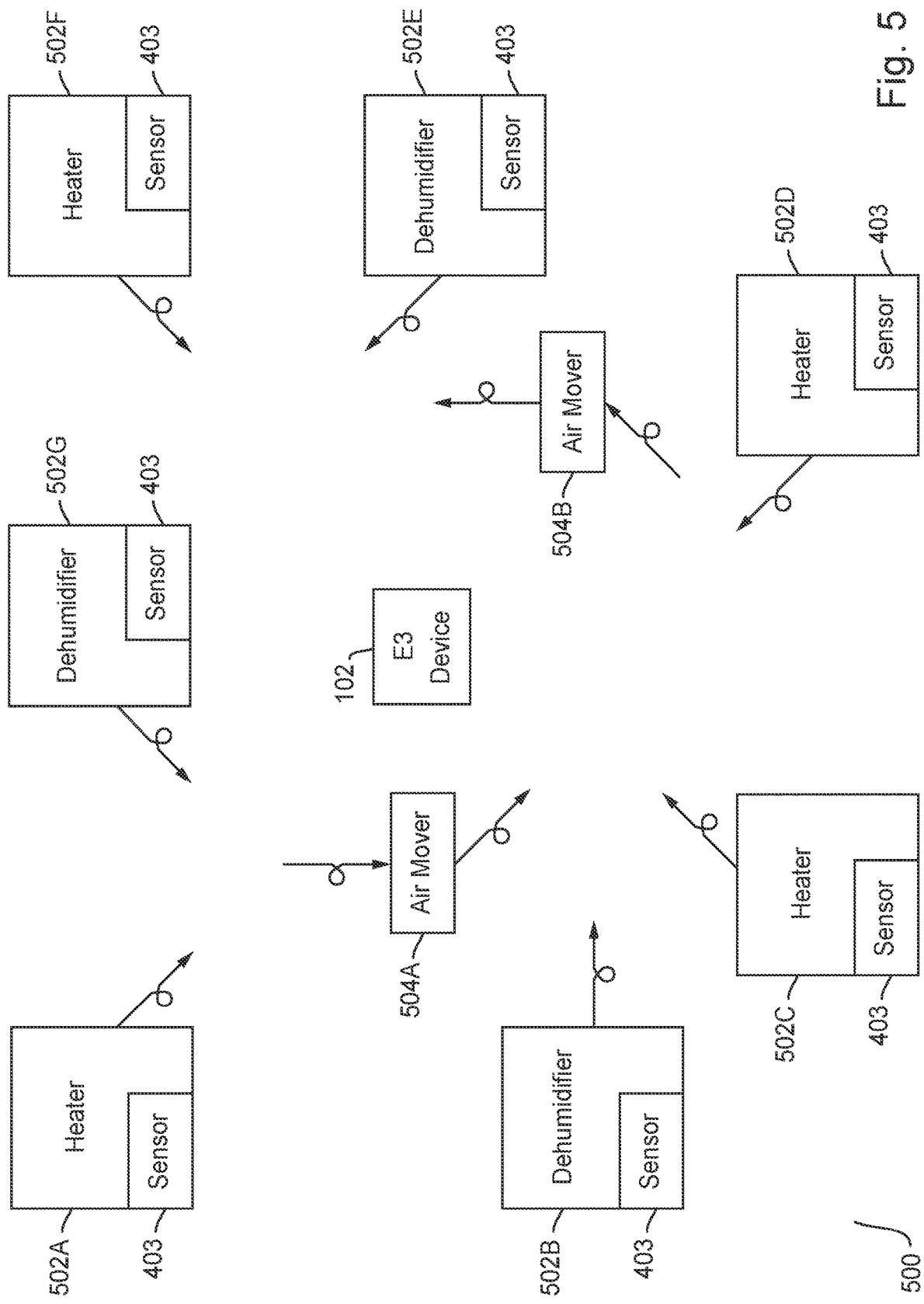
FIG. 5 illustrates a block diagram of the environment with using a drying system having devices and air movers according to the disclosed embodiments.

FIG. 5 depicts a block diagram of environment 100 with using a drying system 500 having devices 502A-G and air movers 504A and 504B according to the disclosed embodiments. Environment 100 may include enthalpy evaporation evaluation device 102, air 104, and materials 106, 108, and 110 disclosed in FIG. 1 along with the components disclosed in FIG. 5. Enthalpy evaporation evaluation device 102 is shown in FIG. 5.

Environment 100 includes devices 502A, 502B, 502C, 502D, 502E, 502F, and 502G. The devices are used to provide heat within environment 100. For example, devices 502A, 502C, 502D, and 502F may be heaters set within environment 100 that provide heat in the amount of Btu/hr to achieve a desired inside temperature. Devices 502B, 502E, and 502G may be dehumidifiers that remove water from environment 100, preferably by removing moisture from air 104. These devices may be placed within environment 100. Further, devices 502A-G may be any combination of heaters and dehumidifiers. Alternatively, devices 502A-G may be all heaters or all dehumidifiers.

Air movers 504A and 504B also may be placed within environment 100 and used in drying system 500. In some embodiments, air movers 504A and 504B may be placed on walls within environment 100. In other embodiments, air movers 504A and 504B may be placed at locations within environment. For example, an air mover may not be placed in the center of rooms with hard wood flooring because air flow has very little impact on drying these surfaces by blowing over the top.

Any number of devices and air movers may be configured within drying system 500. The number and operating conditions for the devices and air movers also may be determined using the E3 value, disclosed above.

Devices 502A-G also include sensors 403, which correspond to sensors 403 in system 400. Sensors 403 may collect data and information that is provided to enthalpy evaporation evaluation device 102 for determining parameters using the processes disclosed above. Further, using the process disclosed below, enthalpy evaporation evaluation device 102 also may determine operating parameters and conditions for drying system 500. The disclosed processes will be used with sensors 403 that will monitor the ambient conditions and evaluate conventional dehumidifiers, low grain dehumidifiers, heaters, or desiccant humidifiers within a drying chamber, or environment 100.

These features will allow operators to evaluate the drying conditions and the performance of drying devices 502A-G in real-time. This ability is unique in the water damage restoration industry. The disclosed embodiments provide unmanipulated accurate data of a drying project and unmanipulated evaluations of the same. This type of evaluation may be achieved for water damage professionals or insurance companies working on remediation projects.

The disclosed processes factor in the current elevation of environment 100, as a structural drying project. The elevation is where the structural drying project is located. When using elevation, the disclosed embodiments use scientific formulas that are accurate to the current location of the project. The water damage restoration industry utilizes project management software systems to track job progress and project information. The disclosed processes will be used within these project management systems, such as system 400 in FIG. 4, to scientifically calculate the necessary equipment needed on any size drying project, evaluate the evaporation ability of the air, evaluate the drying equipment being utilized, and provide complete control over the conditions within environment 100.

The disclosed processes may be used within thermo-hygrometers to provide restoration professionals instant evaluations of the ambient conditions within the drying project and instant evaluations of the dehumidifiers, low grain refrigerant dehumidifiers, heaters, or desiccant dehumidifiers, shown as devices 502A-G in FIG. 5, being used on any water damage restoration or remediation project. A thermo-hygrometer may be a handheld device with sensors 403 to determine the conditions within environment. This device may be shown as enthalpy evaporation device 102 within drying system 500.

In some embodiments, the disclosed processes may be used for insurance companies to evaluate water damage remediation effectiveness on each water mitigation project. This feature will allow insurance companies to grade contractors regardless of the class of water loss, equipment being used, or specific location of the project.

In some embodiments, environment 100 is an open system. The disclosed embodiments may provide open system control for drying system 500. This feature provides the ability to size heating units, calculate how many btu/hour is needed to achieve a desired inside temperature, calculate the cubic footage that a heater will heat to a desired temperature, or even plug in the btu/hour generated by devices 502A-G to determine what inside temperature will be achieved. The disclosed process may solve for cubic feet per minute of air that needs to be exchanged along with solving for the desired inside temperature.

The disclosed process factors in the btu/hour for heaters in wet and non-wet environments. The disclosed process also determines all this information if drying with positive or negative pressure pulling or pushing air into environment 100. The process factors in the specific heat capacity of air and water vapor within a building, the specific heat capacity of the materials within the building, the energy lost and gained by the outside environment, the specific heat capacity of the water within a wet building, and the latent heat of vaporization, or energy required to evaporate the water, of the water within a wet building.

Data inputs for open system evaluation include the starting inside temperature (° F.), the desired inside temperature (° F.), and the outside temperature (° F.). Data inputs also include the size of chamber in cubic feet ($ft^3$) and cubic feet per minute (CFM) of heaters or air movers ($ft^3$/min). This process also takes into account class of loss which is the class factor ($lbs/ft^3$), disclosed in greater detail below.

Class factors may relate to water classifications based on the amount of water within environment 100, looking at materials 106, 108, and 110. A water classification of 1 means less than 25% of the drying chamber, or environment 100, has wet carpet or padding and less than 50% of the walls and ceiling are wet from top to bottom. The class factor (Cf) for a class 1 environment is 0.05 $lbs/ft^3$.

A water classification of 2 means more than 25% of the drying chamber has wet carpet or padding and less than 50% of the walls and ceiling are wet from top to bottom. Class 2 also may mean less than 25% of the drying chamber has wet carpet or padding but 50% or more of the walls and ceiling are wet from top to bottom. The class factor for a class 2 environment is 0.12 $lbs/ft^3$.

A water classification of 3 means more than 25% of the chamber has wet carpet or padding and 50% or more of the walls and ceiling are wet from top to bottom. The class factor for a class 3 environment is 0.16 $lbs/ft^3$. A water classification of 4 indicates the same amount of water as class 1 but in this case 25% or more of the drying chamber includes harder to dry materials like hardwoods, plaster, or gypsum concrete. Better drying conditions are needed to dry these materials so it calls for dehumidification to achieve these conditions. The class factor for a class 4 environment is 0.09 $lbs/ft^3$.

The disclosed embodiments may utilize the following open heating system process to determine the amount of btu/hour required to meet target E3 conditions. The amount of btus needed for a desired temperature also may be determined. The disclosed process may use the following equation:

$$[(Ft^3/min)(4.29 \text{ m-lb/hr-ft}^3)(\Delta F(d-o))(0.24 \text{ btu/lb-F})] + [(Ft^3)(Cf\text{-lbs/ft}^3)(12.6 \text{ btu/lb-hr})] + [(Ft^3)(Cf\text{-lbs/ft}^3)(\Delta F(d-s))(0.012 \text{ btu/lb-°F.-hr})] + [(Ft^3)(\Delta F(d-s))(0.055)\text{btu/hr-ft}^3\text{-F°}] = \text{btu/hour}. \quad \text{Equation 10:}$$

Using this value, a heater, such as device 502A, or a plurality of heaters may be determined in which to meet a target E3 condition. Variable explanations for ΔF includes ΔF(d−o) which equals desired inside temperature minus the outside temperature and ΔF(d−s) which equals desired inside temperature minus starting inside temperature, as received as inputs above. Using Equation 10, one can input a desired temperature to achieve the target E3 condition. Using this value, the btu/hour required to achieve the desired temperature may be determined. The number of heaters may be determined from this value.

In some environment, drying chamber environment 100 may be a closed system. The disclosed embodiments solves for btu/hour of heat to achieve any desired temperature inside drying chamber environment 100 that is used to meet the target E3 condition. The disclosed embodiments also determine what the actual temperature will be within any drying chamber based off the heat load from the drying equipment, or devices 502A-G. The disclosed embodiments also allow the operator to know prior to setting up the equipment, what the inside temperature will be, and if that temperature will be best for the drying devices being utilized.

The disclosed process factors in the specific heat capacity of air and water vapor within a building, the specific heat capacity of the materials within a building, the energy lost and gained by the outside, the specific heat capacity of the water within a wet building, and the latent heat of vaporization, or the energy required to evaporate the water, of the water within a wet building.

Data inputs for a closed system analysis includes the starting inside temperature (° F.), the desired inside temperature (° F.), the outside temperature (° F.), the size of the drying chamber ($ft^3$), and the class of loss, or class factor, as disclosed above. Class factors from the different classifications match the ones disclosed above.

The disclosed embodiments may utilize the following closed heating system process to determine the amount of btu/hour required to meet target E3 conditions. The amount of btus needed for a desired temperature also may be determined. The disclosed process may use the following equation:

$$[(Ft^3)(0.0357 \text{ lbs/ft}^3\text{-hr})(\Delta F(d-o))(0.24 \text{ btu/lb-°F.})] + [(Ft^3)(Cf\text{-lbs/ft}^3)(12.6 \text{ btu/lb-hr})] + [(Ft^3)(Cf\text{-lbs/ft}^3)(\Delta F(d-s))(0.012 \text{ btu/lb-°F.-hr})] + [(Ft^3)(\Delta F(d-s))(0.055)\text{btu/hr-ft}^3\text{-F°}] = \text{btu/hour}. \quad \text{Equation 11:}$$

Using this value, a heater, such as device 502A, or a plurality of heaters may be determined in which to meet a target E3 condition.

The disclosed embodiments may use daily target E3 values to track and manage drying operations for a drying chamber, such as environment 100. Using the above Equation 10 or 11, the disclosed embodiments also may determine the amount of heat that will be needed to achieve a target E3 condition. Tables also may be made with the target E3 values for a target condition. Within each table, the target E3 values for the first three days of operation may be provided. These are target values that the drying operations should strive to achieve for effective drying operations. It should be noted that the target values are not the same for each day, even between the same equipment.

Example tables may look like Tables 1 and 2 below

TABLE 1

Outside Specific Humidity of 20 gpp for Classification 1 or 4

| Equipment | Day 1 | Day 2 | Day 3 |
|---|---|---|---|
| Conventional Dehumidification | 84 | 91 | 99 |
| LGR Dehumidification | 140 | 180 | 215 |
| LGR Dehumidification with Sol. | 264 | 360 | 447 |
| Desiccant DH (Positive Pressure Set-up) | 249 | 297 | 321 |
| Desiccant DH (Neutral Pressure Set-up) | 213 | 273 | 309 |
| Desiccant DH (Negative Pressure Set-up) | 225 | 285 | 318 |
| Heating Unit | 519 | 561 | 561 |

LGR-low grain refrigerant
DH-dehumidifier

TABLE 2

Outside Specific Humidity of 40 gpp for Classification 1 or 4

| Equipment | Day 1 | Day 2 | Day 3 |
|---|---|---|---|
| Conventional Dehumidification | 84 | 91 | 98 |
| LGR Dehumidification | 133 | 173 | 207 |
| LGR Dehumidification with Sol. | 258 | 333 | 405 |
| Desiccant DH (Positive Pressure Set-up) | 216 | 270 | 315 |
| Desiccant DH (Neutral Pressure Set-up) | 207 | 279 | 330 |
| Desiccant DH (Negative Pressure Set-up) | 210 | 255 | 294 |
| Heating Unit | 372 | 390 | 390 |

These values may be used to track the effectiveness of the drying operations. It should be noted that each equipment technology is impacted by the outside specific humidity, some more than others.

If a target E3 value for a target condition is not reached, then a problem with the drying operations may be identified. A list of potential problems associated with not meeting a target E3 value includes equipment being turned off or dehumidifiers not being programmed correctly. If the E3 target value is not achieved, then it means something is wrong. Other problems include one or more breakers on a device tripped, inside temperature is too high or too low, dehumidifiers do not have the correct grain depression, not enough dehumidification, not enough airflow, poor extraction (did not get enough water out of the pad or carpet), did not factor in the outside load into dehumidification, ground is exposed, or did not classify the job correctly.

Figure 6:
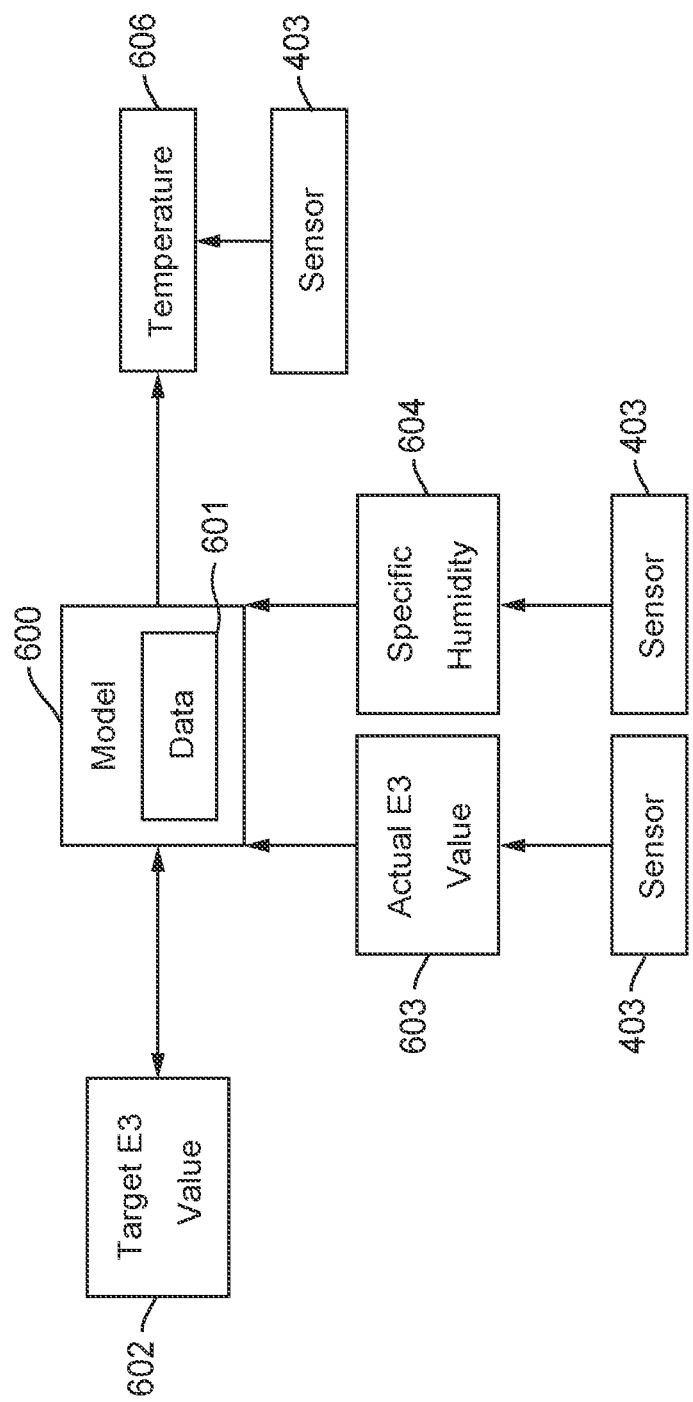
FIG. 6 illustrates a block diagram for determining a temperature and other parameters using an enthalpy evaporation evaluation model according to the disclosed embodiments.

The disclosed embodiments also utilize E3 values in relation to temperature and specific humidity. This relationship may be disclosed by FIG. 6. The disclosed embodiments may use the target values for use in determining the drying time for certain conditions. As can be seen, the values change with different temperatures and specific humidity values.

Actual E3 value 603 for an enthalpy evaporation condition is determined as disclosed above by the steps shown in flowchart 300. Sensors 403 may be used in collecting the information needed to determine actual E3 value 603 using device 102. Further, target E3 value 602 may be a target value taken from a table of target E3 values, as disclosed above, based on desired parameters or criteria. Target E3 value 602 may be stored on enthalpy evaporation evaluation device 102.

Enthalpy evaporation evaluation model 600 may receive actual E3 value 603 along with other information, such as specific humidity 604 and temperature 606 to perform processes related to drying operations on device 102. Model 600 may include data structure 601 that includes target E3 values 602 that are retrieved when needed. These processes are disclosed in greater detail below.

Device 102 also may receive specific humidity 604 for environment 100 through one or more sensors 403. Specific humidity 604 is input to model 600. Using specific humidity 604 along with target E3 value 602 or actual E3 value 603, model 600 may determine a temperature 606 to be achieved in order to meet the enthalpy evaluation condition needed to achieve the target E3 value.

In other embodiments, temperature 606 may be detected using one or more sensors 403 and provided to model 600 to determine a specific humidity 604 needed to achieve target E3 value 602. In further embodiments, temperature 606 and specific humidity 604 may be provided to device 102 using one or more sensors 403 and input to model 600 to determine a target E3 value 602. Target E3 value 602 may differ from actual E3 value 603. Model 600 also may compare target E3 value 602 to actual E3 value 603 to make decisions on configuring or adjusting equipment for drying operations.

In determining these values, enthalpy evaporation evaluation model 600 may use data structure 601. Data structure 601 may include data that represent the relationships between target E3 values, specific humidity, and temperature for various types of devices. Data structure 601 may receive any of these values as inputs to determine temperature. Alternatively, specific humidity 604 and temperature 606 may be input to data structure 601 to determine target E3 value 602. Data structure 601 may use look-up tables to determine the desired value of a parameter. In other embodiments, data structure 601 may be a tree structure. Model 600 and data structure 601 are used to modify the performance of devices 502A-G for drying operations.

For example, Table 1 above specifies an E3 target value 602 of 519 for day 1 of drying operations with a specific humidity 604 of 20 gpp. Temperature 606 to achieve this target value should be between 75 and 80 degrees Fahrenheit. This temperature then may be used in Equations 10 and 11 to determine how much btu/hour is needed to achieve the target E3 value. Actual E3 value 603 also may be determined to compare to target E3 value 602 to indicate whether the drying system is operating at desired levels.

Figure 7:
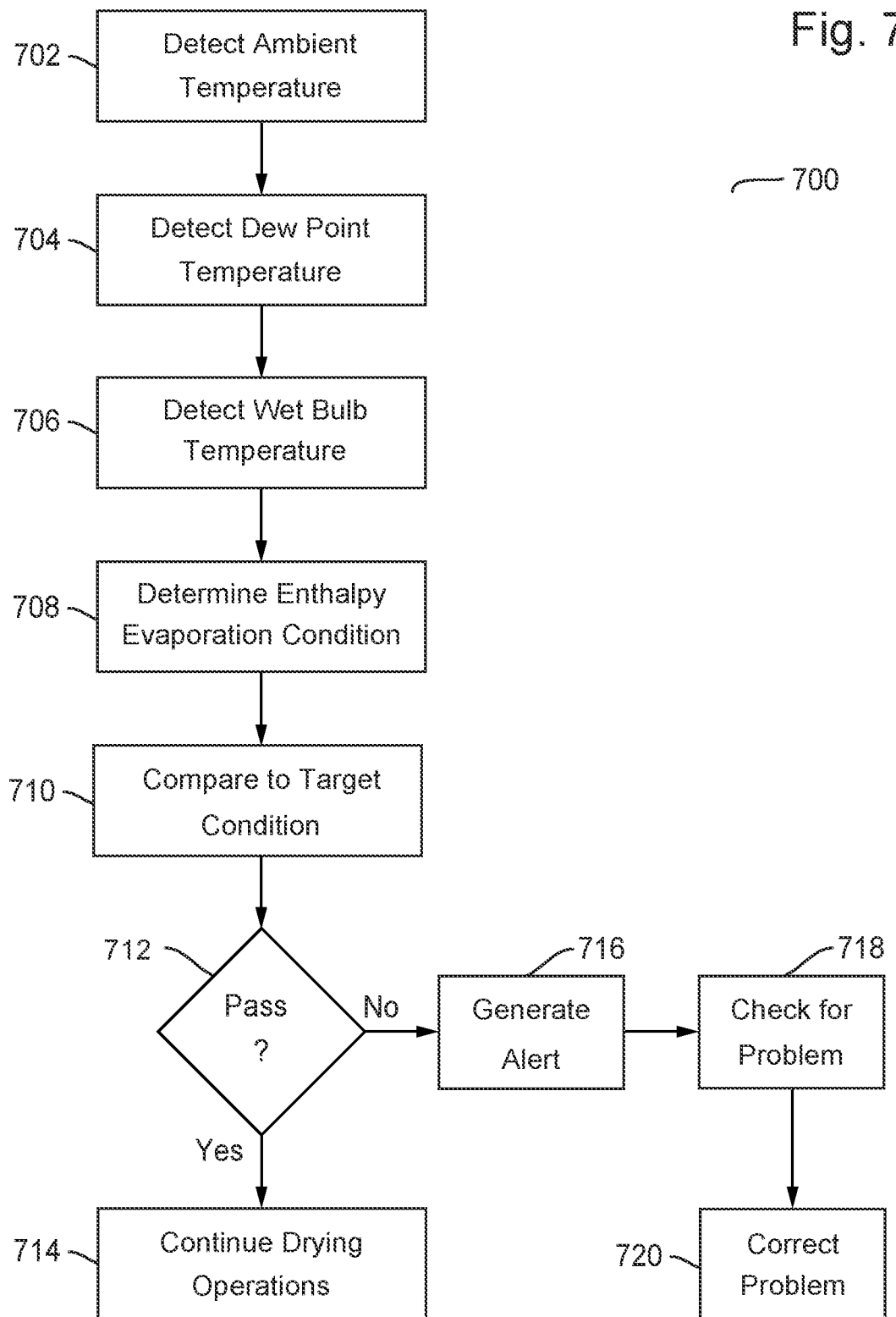
FIG. 7 illustrates a flowchart for evaluating an environment undergoing drying operations according to the disclosed embodiments.

FIG. 7 depicts a flowchart 700 for evaluating environment 100 undergoing drying operations according to the disclosed embodiments. Flowchart 700 may refer to FIGS. 1-6 for illustrative purposes. Flowchart 700, however, is not limited to the features disclosed in FIGS. 1-6.

Step 702 executes by detecting an ambient temperature of environment 100 using ambient temperature sensor 207, as disclosed above. Step 704 executes by detecting a dew point temperature of environment 100 using dew point temperature sensor 209, as disclosed above. Step 706 executes by detecting a wet bulb temperature of environment 100 using wet bulb temperature sensor 211, as disclosed above. Other conditions or parameters of environment 100, such as the ambient latent energy, the dew point latent energy, and the wet bulb latent energy, also are determined.

Step 708 executes by determining the enthalpy evaporation condition of environment 100. The enthalpy evaporation condition includes actual E3 value 603. Step 708 corresponds to step 326 disclosed above.

Step 710 executes by comparing the enthalpy evaporation condition of environment 100, preferably running drying system 500, to a target condition. In some embodiments, this process includes comparing actual E3 value 603 to target E3 value 602 using model 600. Target E3 value 602 may be obtained using specific humidity 604 and temperature 606 of the drying chamber inputted to model 600.

Step 712 executes by determining whether current drying conditions using system 500 are meeting the requirements for the target conditions, such as target E3 value 602. In some embodiments, it may be determined whether actual E3 value 603 is within an acceptable range, such as 5%, of target E3 value 602. If step 712 is yes, then the current drying conditions are acceptable and no changes need to be made to system 500. The number of heaters, dehumidifiers, and air movers appear to be working properly. Thus, step 714 executes by continuing drying operations as is.

If step 712 is no, then changes need to be made to the drying operations within environment 100. Step 716 executes by sending an alert generated in response to the failed comparison of the actual enthalpy evaporation condition with the target evaporation condition. The alert may be a message from device 102. Alternatively, it may be a message displayed on device 102. The alert also may be send to mobile device 404 or computer 406, or received at server 402, disclosed in system 400 above.

As a result of the alert, step 718 executes by checking for a potential problem within drying system 500, as disclosed above. The operator may check devices 502A-G for potential problems or unavailable power. Conditions within environment 100 also may be checked. Step 720 executes by correcting one or more problems within drying system 500. For example, additional devices 502A-G may be deployed. Flowchart 700 may be executed again after a period of time to ensure that the modifications to the system are effective to achieve the target evaporation condition.

Figure 8:
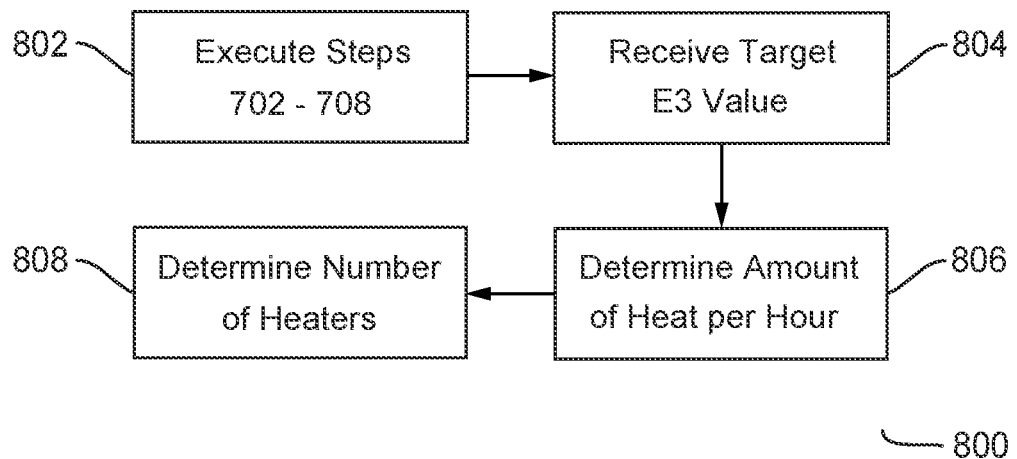
FIG. 8 illustrates a flowchart for determining an amount of heat per hour for the drying environment according to the disclosed embodiments.

FIG. 8 illustrates a flowchart 800 for determining an amount of heat per hour for the drying environment 100 according to the disclosed embodiments. Flowchart 800 may refer to FIGS. 1-7 for illustrative purposes. Flowchart 800, however, is not limited to the features disclosed in FIGS. 1-7.

Step 802 executes by executing steps 702-708 disclosed in flowchart 700 to determine actual E3 value 603. Step 804 executes by receiving a target E3 value 602 for a target condition within environment 100. Target E3 value 602 may be determined as disclosed above. Using target E3 value 602, step 806 may determine an amount of heat per hour needed to achieve the target condition. Actual E3 value 603 may be used to determine a difference between it and target E3 value 602. Equations 10 and 11 may be used to determine the amount of heat needed to achieve a desired temperature to achieve target E3 value. Using these values, step 808 executes by determining the number of heaters needed to provide the amount of heat per hour, or btu/hour, to achieve the target evaporation condition.

Figure 9:
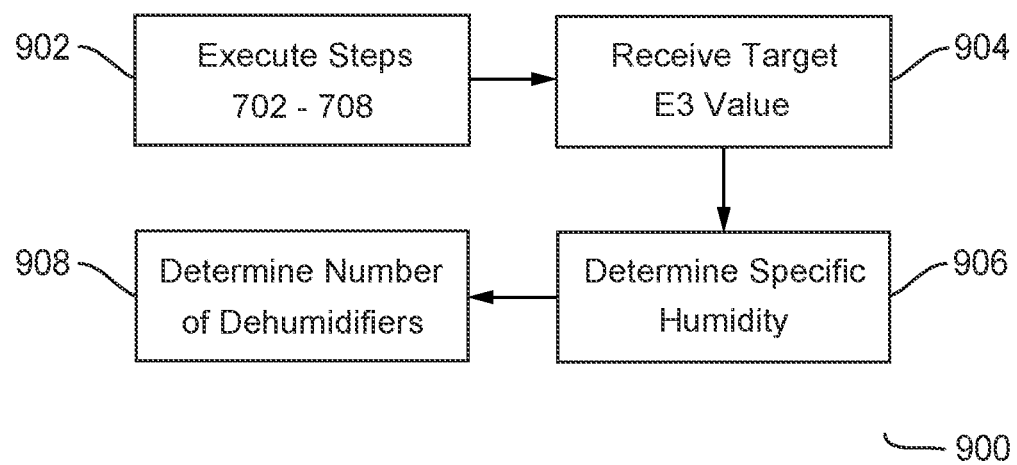
FIG. 9 illustrates a flowchart for determining a specific humidity for the drying environment according to the disclosed embodiments.

FIG. 9 illustrates a flowchart 900 for determining a specific humidity 604 for the drying environment 100 according to the disclosed embodiments. Flowchart 900 may refer to FIGS. 1-8 for illustrative purposes. Flowchart 900, however, is not limited to the features disclosed in FIGS. 1-8.

Step 902 executes by executing steps 702-708 disclosed in flowchart 700 to determine actual E3 value 603. Step 904 executes by receiving a target E3 value 602 for a target condition within environment 100. Target E3 value 602 may be determined as disclosed above. Using target E3 value 602, step 806 may determine an amount of moisture to be removed from air 104 for the specific humidity 604 to achieve the target condition. Actual E3 value 603 may be used to determine a difference between it and target E3 value 602. The disclosed embodiments may determine the amount of moisture to remove to achieve a desired specific humidity 604 to achieve target E3 value. Using these values, step 908 executes by determining the number of dehumidifiers needed to provide the moisture removal to achieve the target evaporation condition. The following equations may be used Equation 12: Cubic feet of chamber (ft³)/division factor (ft³/pint-day)=initial pints/day;

Equation 13: Initial pints/day+ or −outside load pints/day=total pints/day; and

Equation 14: Number of dehumidifiers required=Total pints/day/Desiccant AHAM (saturation) rating (pints/day). Always round up to have enough dehumidifiers.

Figure 10:
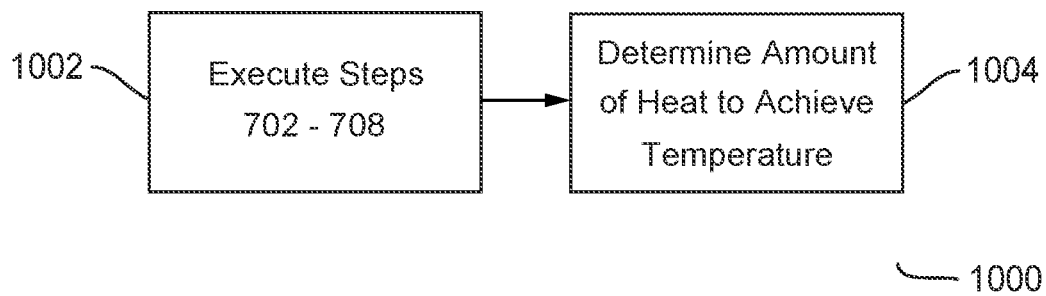
FIG. 10 illustrates a flowchart for determining an amount of heat for a desired temperature within the drying environment according to the disclosed embodiments.

FIG. 10 illustrates a flowchart 1000 for determining an amount of heat for a desired temperature 606 within the drying environment 100 according to the disclosed embodiments. Flowchart 1000 may refer to FIGS. 1-9 for illustrative purposes. Flowchart 1000, however, is not limited to the features disclosed in FIGS. 1-9.

Step 1002 executes by Step 802 executes by executing steps 702-708 disclosed in flowchart 700 to determine actual E3 value 603. Step 1004 executes by determining an amount of heat per hour to achieve a temperature 606 within drying environment 100 according to the enthalpy evaporation condition, as exemplified by actual E3 value 603. Actual E3 value 603 may be compared to a target E3 value 602. Except this target E3 value 602 is received by the operator at device 102. In other words, an objective E3 value is input and compared to actual E3 value 603. The difference using model 600 is determined and the amount of btu/hr needed to make up the shortfall between the target evaporation condition and the actual condition.

It will be apparent to those skilled in the art that various modifications and variations can be made in the disclosed embodiments of the present invention without departing from the spirit or scope of the invention. Thus, it is intended that the present invention covers the modifications and variations of the embodiments disclosed above provided that they come within the scope of any claims and their equivalents.

What is claimed is:

1. A method for determining evaporation parameters for a drying chamber, the method comprising:
   determining an ambient sensible energy value using an ambient sensible energy module of an enthalpy evaporation evaluation device based on an ambient temperature value measured by an ambient temperature sensor and an ambient humidity ratio value for air measured by an ambient humidity ratio sensor in an environment of the drying chamber;
   determining a dew point sensible energy value using a dew point sensible energy module of the enthalpy evaporation evaluation device based on a dew point temperature value measured by a dew point temperature sensor and a dew point humidity ratio value for the air measured by a dew point humidity ratio sensor in the environment;
   determining a wet bulb sensible energy value using a wet bulb sensible energy module of the enthalpy evaporation evaluation device based on a wet bulb temperature value measured by a wet bulb temperature sensor and a wet bulb humidity ratio value for the air measured by a wet bulb humidity ratio sensor in the environment;
   determining an ambient latent energy value using an ambient latent energy module of the enthalpy evaporation evaluation device based on the ambient humidity ratio value for the air measured by the ambient humidity ratio sensor in the environment;
   determining a dew point latent energy value using a dew point latent energy module of the enthalpy evaporation evaluation device based on the dew point humidity ratio value for the air measured by the dew point humidity ratio sensor in the environment;
   determining a wet bulb latent energy value using a wet bulb latent energy module of the enthalpy evaporation evaluation device based on the wet bulb humidity ratio value for the air measured by the wet bulb humidity ratio sensor in the environment;
   determining an enthalpy evaporation evaluation value for the environment using a processor of the enthalpy evaporation evaluation device based on the ambient sensible energy value, the dew point sensible energy value, the wet bulb sensible energy value, the ambient latent energy value, the dew point latent energy value, and the wet bulb latent energy value; and determining a drying time for the drying chamber based on the enthalpy evaporation evaluation value using the enthalpy evaporation evaluation device.

2. The method of claim 1, wherein the enthalpy evaporation evaluation value is a target value.

3. The method of claim 2, further comprising determining a problem with drying operations in the environment using the target value.

4. An enthalpy evaporation evaluation device configured to
measure an ambient temperature value of a drying chamber with an ambient temperature sensor;
measure an ambient humidity ratio value of the drying chamber with an ambient humidity ratio sensor;
determine an ambient sensible energy value using an ambient sensible energy module based on the ambient temperature value and the ambient humidity ratio value for air in an environment of the drying chamber;
measure a dew point temperature value of the drying chamber with a dew point temperature sensor;
measure a dew point humidity ratio value of the drying chamber with a dew point humidity ratio sensor;
determine a dew point sensible energy value using a dew point sensible energy module based on the dew point temperature value and the dew point humidity ratio value for the air in the environment of the drying chamber;
measure a wet bulb temperature value of the drying chamber with a wet bulb temperature sensor;
measure a wet bulb humidity ratio value of the drying chamber with a wet bulb humidity ratio sensor;
determine a wet bulb sensible energy value using a wet bulb sensible energy module based on the wet bulb temperature value and the wet bulb humidity ratio value for the air in the environment of the drying chamber;
determine an ambient latent energy value using an ambient latent energy module based on the ambient humidity ratio value for the air in the environment of the drying chamber;
determine a dew point latent energy value using a dew point latent energy module based on the dew point humidity ratio value for the air in the environment of the drying chamber;
determine a wet bulb latent energy value using a wet bulb latent energy module based on the wet bulb humidity ratio value for the air in the environment of the drying chamber;
determine an enthalpy evaporation evaluation value for the environment using a processor based on the ambient sensible energy value, the dew point sensible energy value, the wet bulb sensible energy value, the ambient latent energy value, the dew point latent energy value, and the wet bulb latent energy value; and
determine a drying time for the drying chamber based on the enthalpy evaporation evaluation value.

5. The device of claim 4, wherein the enthalpy evaporation evaluation value is a target value.

6. The device of claim 5, further configured to determine a problem with drying operations in the environment using the target value.

7. A computer program stored on a non-transitory computer readable medium, the computer program comprising instructions that, when read by a processor, cause the processor to
determine an ambient sensible energy value using an ambient sensible energy module of an enthalpy evaporation evaluation device based on an ambient temperature value measured by an ambient temperature sensor and an ambient humidity ratio value for air measured by an ambient humidity ratio sensor in an environment of the drying chamber;
determine a dew point sensible energy value using a dew point sensible energy module of the enthalpy evaporation device based on a dew point temperature value measured by a dew point temperature sensor and a dew point humidity ratio value for the air measured by a dew point humidity ratio sensor in the environment;
determine a wet bulb sensible energy value using a wet bulb sensible energy module of the enthalpy evaporation evaluation device based on a wet bulb temperature value measured by a wet bulb temperature sensor and a wet bulb humidity ratio value for the air measured by a wet bulb humidity ratio sensor in the environment;
determine an ambient latent energy value using an ambient latent energy module of the enthalpy evaporation evaluation device based on the ambient humidity ratio value for the air measured by the ambient humidity ratio sensor in the environment;
determine a dew point latent energy value using a dew point latent energy module of the enthalpy evaporation evaluation device based on the dew point humidity ratio value for the air measured by the dew point humidity ratio sensor in the environment;
determine a wet bulb latent energy value using a wet bulb latent energy module of the enthalpy evaporation evaluation device based on the wet bulb humidity ratio value for the air measured by the wet bulb humidity ratio sensor in the environment; and
determine an enthalpy evaporation evaluation value for the environment using a processor of the enthalpy evaporation evaluation device based on the ambient sensible energy value, the dew point sensible energy value, the wet bulb sensible energy value, the ambient latent energy value, the dew point latent energy value, and the wet bulb latent energy value; and
determine a drying time for the drying chamber based on the enthalpy evaporation evaluation value using the enthalpy evaporation evaluation device.

* * * * *